United States Patent [19]
Hallock

[11] 4,433,949
[45] Feb. 28, 1984

[54] SPLIT HEAD FASTENER

[76] Inventor: Robert L. Hallock, 7136 NE. 8th Dr., Boca Raton, Fla. 33431

[21] Appl. No.: 298,223

[22] Filed: Aug. 31, 1981

[51] Int. Cl.³ .............................................. F16B 15/00
[52] U.S. Cl. .................... 411/477; 411/439; 10/30; 72/325
[58] Field of Search .............. 411/439, 477; 10/30, 10/49, 57; 72/335, 325

[56] References Cited

U.S. PATENT DOCUMENTS 1,281,649 10/1918 Peterson .............................. 72/325

Primary Examiner—Wayne L. Shedd
Attorney, Agent, or Firm—Dowell & Dowell

[57] ABSTRACT

A fastener having an integral head and shank which are formed from a strip of sheet metal of indeterminate length in which the head is formed by slitting and compressing a section from one edge of the sheet material to provide a split head having two substantially similar halves with at least a portion of each half being generally perpendicular to the shank and with at least a portion of the head being thicker than one-half of the thickness of the sheet material and in which the forming of the head causes a slot in the upper surface of the head which is less than one-third the thickness of the sheet material.

9 Claims, 11 Drawing Figures

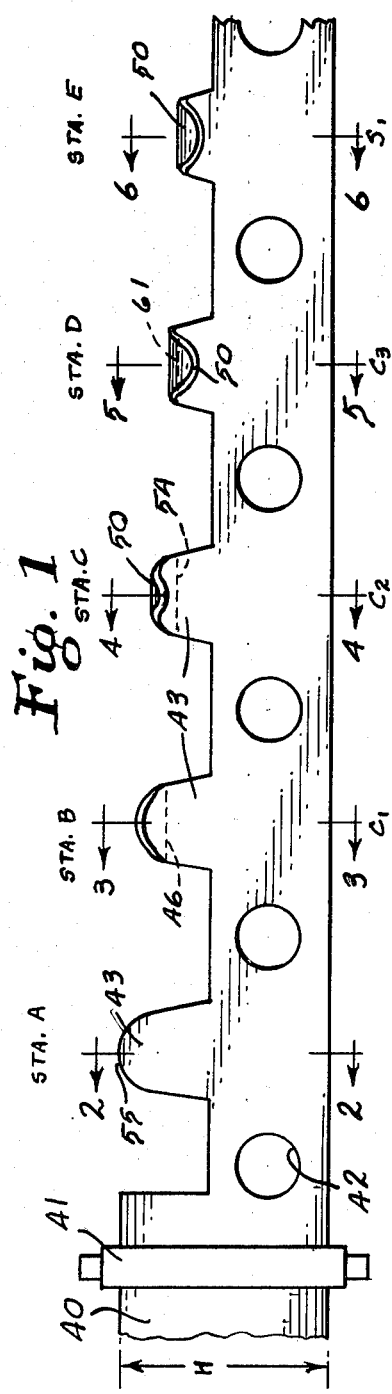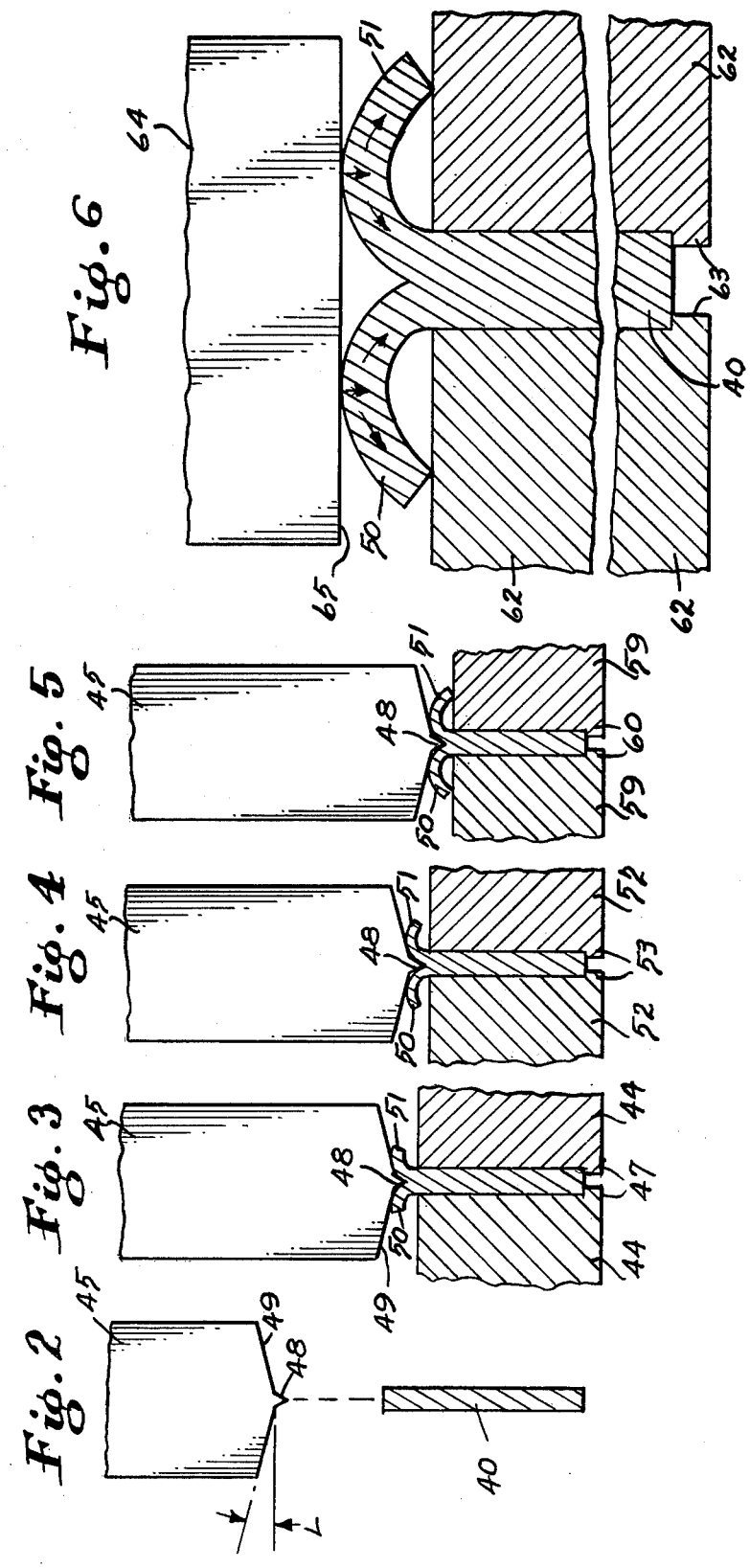

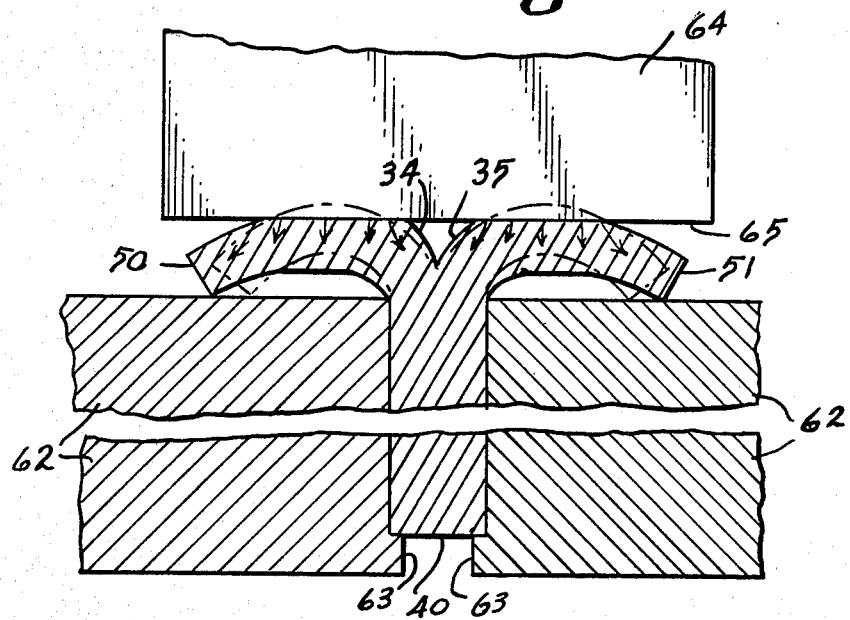
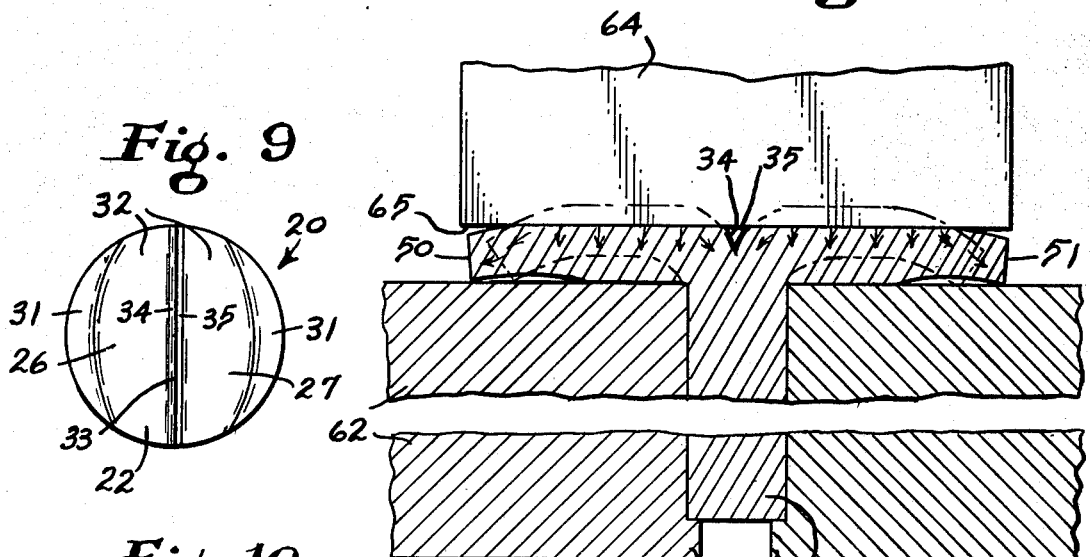
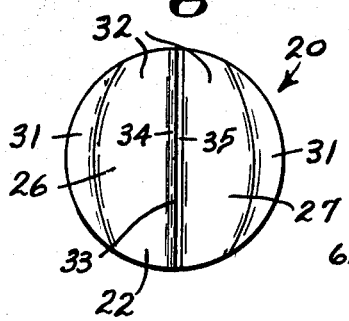
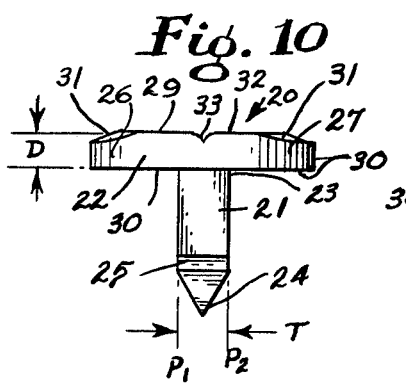
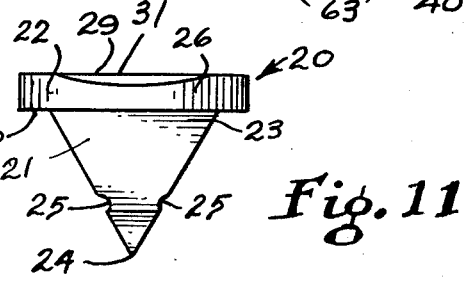

SPLIT HEAD FASTENER

TECHNICAL FIELD

This invention relates generally to fasteners and relates particularly to fasteners having an integrally formed head and shank that are made of sheet material and in which one edge of the sheet material is provided with a plurality of raised portions, each of which is split to create two halves that are substantially formed and pressed to provide generally planar head members which are disposed generally normal to the shank.

BACKGROUND ART

Heretofore, many fasteners have been provided having an integral head and shank, however, most of these fasteners have been formed from wire stock in which a portion of the wire stock is clamped, after which an impact force is applied to an end of the wire stock to form an enlarged head. Some examples of this type of fastener are shown by U.S. Pat. Nos. 334,361 to Eppler Jr.; 797,494 to Chase; 2,875,664 to Crooks; 3,109,187 to Pirc and 3,359,582 to Powers as well as British Patent Nos. 375,268 and 391,275.

Also, some efforts have been made to provide a fastener having an integral T-shaped head by splitting a portion of the shank lengthwise and then bending one-half to one side and the other half to the other side. An example of this type of structure is disclosed in Swiss Patent No. 265,776.

DISCLOSURE OF THE INVENTION

The present invention is embodied in a nail or other fastener which is formed from sheet material and includes a shank having an integral head and in which the head is made by slitting one end of the shank lengthwise of the sheet material and then forming the opposite halves so that at least a portion of each half is generally perpendicular to the shank and at least a portion of each half has a thickness greater than the thickness of one-half of the sheet material. The forming of the integral head causes a slot in the upper surface of the head and such slot is disposed centrally of the head and lengthwise of the sheet material and such slot is no more than one-third the thickness of the sheet material.

It is an object of the invention to provide a fastener which may be manufactured from a strip of sheet material so as to have an integrally formed head and shank in which the head is formed in a manner such that the head will not bend or crack when the fastener is driven.

It is another object of the invention to provide a fastener which is formed of sheet material in a substantially continuous process so as to have an integral head and shank in which one edge of the sheet material is formed so as to have outwardly extending projections which are slit lengthwise of the material into two halves which subsequently are shaped to form an integral head with at least portions of such halves being greater in thickness than one-half the thickness of the sheet material.

BRIEF DESCRIPTION OF THE DRAWINGS

FIG. 1 is a side elevational view of a portion of a strip of sheet material and illustrating sequential steps in forming the split head of the present invention.

FIG. 2 is a sectional view taken on the line 2—2 of FIG. 1.

FIGS. 3, 4 and 5 are sections taken on lines 3—3, 4—4 and 5—5 respectively of FIG. 1 and illustrating the sequential steps in slitting the head of the fastener.

FIG. 6 is an enlarged fragmentary section taken on the line 6—6 of FIG. 1 and illustrating the first step of the pressing operation.

FIGS. 7 and 8 are enlarged fragmentary views similar to FIG. 6 and showing sequential steps in the pressing operation.

FIG. 9 is a top plan view illustrating one embodiment of the fastener of the present invention.

FIG. 10 is a side elevational view thereof.

FIG. 11 is a front elevational view thereof.

DESCRIPTION OF THE PREFERRED EMBODIMENT

With continued reference to the drawings, a fastener 20 in the form of a nail or tack is shown in FIGS. 9–11 as it is in its completed or finished configuration after being slit and formed from a strip of sheet material.

The fastener 20 includes a shank and a head 21 and 22 respectively. The shank 21 may be of various conventional designs but a preferred design is shown as having a generally rectilinear cross-section and is inclined or tapered from the upper portion 23 thereof where it is integrally connected to the head 22 to a point 24 remote from the head. If desired, a recess 25 may be provided along opposite edges of the shank in order to provide areas into which another material such as steel or the like may flow as the fastener is driven into such other material.

The head 22 of the fastener is generally circular in final configuration as shown in FIG. 9 having first and second generally semicircular halves or sections 26 and 27 which are integrally formed and extend outwardly from the upper portion 23 of the shank 21. Each of the sections 26 and 27 of the head have upper and lower surfaces 29 and 30 respectively. The upper surface includes an outermost tapered or inclined portion 31 which extends outwardly beyond the shank as shown in FIGS. 9–11 and an innermost generally planar portion 32.

With particular reference to FIGS. 9 and 10, as a result of the steps involved in slitting and forming the head of the fastener integrally with the shank portion, a slot or groove 33 is created which extends across the top of the head generally centrally of the thickness of the sheet material from which the fastener is formed. It has been determined that the slot should not exceed approximately one-third of the thickness of the upper portion 23 of the shank 21. Thus, in effect, the innermost planar portions 32 of the head 22 should overlie at least two-thirds of the thickness of the upper portion 23 of the shank. That is, if an imaginary line is extended along the planes $P_1$ and $P_2$ defining the thickness T of the sheet material forming the upper portion 23 of the shank 21, which thickness is equal to the thickness of the stock sheet material from which the fastener is formed, then such innermost planar impacting portions 32 of each half of the head should extend inwardly of each of such planes a distance equal to at least one-third of dimensions T.

In this manner, it is possible to reduce the likelihood of failure of the sheet material from which the head and shank are formed particularly at locations across the generally arcuate walls 34 and 35 defining the area of the groove 33. Such walls, which have been subjected to deformation due to the slicing and shaping operations discussed below, may be prone to fracture caused by a tool impacting the head of the fastener. However, the structure of the fastener 20 will reduce the possibility of such failure since at least two-thirds of the upper area of the shank are covered by the innermost planar impacting portions 32 of the head. The stresses which are applied upon impact by a driving tool will be transferred to the shank without damage to the joint between the head and shank or in the area of the walls of the groove 33. Should the area of the head defined by the groove 33 be greater than approximately one-third of the underlying upper portion of the shank, then the head will have a tendency to deflect or bend relative to the shank and thus possibly cause a failure adjacent such aforementioned wall areas of the groove.

In addition to the foregoing characteristics of the orientation and size of the various portions of the fastener head, the integral one-piece fastener of the present invention is constructed in such a manner that the halves 26 and 27 of the head are greater in thickness dimension D than one-half of the thickness dimension T of the stock sheet material from which the head and shank of the fastener are formed. By forming the fastener head with an increased thickness, the possibility of fracturing, cracking, bending or otherwise damaging the head of the fastener upon impact is further reduced.

With reference to FIGS. 1 through 8, there are shown the various steps in shaping and forming the head of a fastener 20 in accordance with the present invention. A strip 40 of relatively soft sheet metal such as annealed high carbon steel having a predetermined thickness T and a predetermined height H but of indeterminate length is provided. Preferably, the strip 40 is stored in a coil for ease of handling, however, it is contemplated that flat strips may be used particularly if a conventional feeding machine is available. Also, it is contemplated that individual pieces of sheet metal may be provided so that the fasteners 20 may be made one at a time.

The strip 40 preferably is disposed along a generally vertical plane and is introduced into a series of forming stations through a pair of opposed pressure rollers 41 which function to iron out or flatten any edge burrs or other deflected portions of the strip. The sheet metal strip includes a series of equally spaced holes 42 which are engaged by an appropriate indexing means (not shown) to advance the strip intermittantly from station to station along a sequential forming line in a step by step manner.

After passing the opposed rollers 41, the strip is indexed into a blanking station A having a conventional punch and die or shear (not shown). At blanking station A, a portion of the upper edge of the sheet material is removed, thereby forming at least one generally semicircular projection or element 43 which extend upwardly from the remaining portion of the strip material.

Subsequent to this initial blanking operation, the strip of sheet material 40 is advanced to a series of head slitting and forming stations shown at stations B, C, D and E of FIG. 1. At the first slitting station B, opposed pressure pads 44 are brought into engagement with the sheet material and firmly hold the material while a slitting tool 45 is driven downwardly into engagement with the upper edge of the previously formed upstanding projections 43. With particular reference to FIG. 3, the upper surfaces of pressure pads 44 engage the sheet material along or just below the depth of a desired initial shear line 46 so as to reduce any tendency of the projections 43 to bend to either side. This shear line extends generally along the longitudinal centerline of the strip and from side to side of the projections 43. In order to insure that the strip of metal is not forced downwardly under the impact of the slitting tool 45, an outwardly extending shoulder 47 may be provided at the lower portion of the pressure pads 44 and such shoulders underlie and engage the lower edge of the strip of material 40.

The slitting tool 45 includes a cutting blade 48 having a sharp cutting edge along the lowermost portion thereof and such blade is connected to a pair of outwardly and upwardly inclined deflecting surfaces 49 which are disposed at a desired angle such as, for example, an angle L (FIG. 2) of approximately 10° above a horizontal plane. The slitting tool 45 is actuated by a force of approximately 200 PSI so that the cutting blade 48 slices downwardly a predetermined distance through the upper portion of the projections 43 of the sheet material to thereby initially divide such elements into two identical halves 50 and 51 which curve upwardly and outwardly from the shear line. As the slitting tool 45 continues to descend, the halves 50 and 51 are urged outwardly by the blade 48 and the deflecting surfaces 49 so as to assume a bifurcated generally V-shaped configuration with such halves being separated from one another by a pronounced groove.

At station C (FIG. 4), a second set of opposed pressure pads 52 having outwardly extending shoulders 53 engage the sides and bottom edge of the sheet material with the upper surfaces of such pads being in vertically spaced relationship with the first shear line and just below a second shear line 54 which is more deeply disposed or oriented with respect to the upper surface or edge 55 of the semicircular projections 43. At station C, another slitting tool 45 is urged downwardly into the same slit that was formed by the first slitting tool and then is forced downwardly a second predetermined distance to extend the depth of penetration and further divide the halves 50 and 51 being formed from the sheet metal. At this station, the deflecting surfaces 49 of the slitting tool cause the halves 50 and 51 to begin to assume an arcuate configuration.

At station D (FIG. 5), another set of opposed pressure pads 59 having shoulders 60 engage the sides and bottom edge of the sheet material with the upper surfaces of such pads being in vertically spaced relationship with the second shear line and below the final shear line 61. A third slitting tool 45 is urged downwardly into the same slit that was formed by the first and second slitting tools and then is forced downwardly a third predetermined distance to extend the depth of penetration to the final shear line 61. As the cutting edge of the blade 48 of the slitting tool 45 penetrates into the sheet material, the deflecting surfaces 49 of the tool urge the separated material outwardly and downwardly in an arcuate path until the leading edge of each half engages or approximately engages the upper surfaces of the pressure pads 59.

Although three slitting stations have been shown and described, it is noted that any desired number of stations may be provided and such number will depend on several factors including the thickness of the material, size of the proposed head, hardness of the material and the like.

Upon the completion of the slitting operation, the sheet material is indexed to the head forming station E. With particular reference to FIG. 6, another set of pressure pads or clamping devices 62 having outwardly extending shoulders 63 are urged into engagement with the sides and bottom edge of the sheet material and a forming press 64 having a flat surface 65 is urged into engagement with the upper portion of the curved halves 50 and 51 under a force of approximately 2,500-3,000 PSI.

At the head forming station E, the forming press 64 is moved downwardly so that the flat surface 65 engages the upper surface of the curved halves 50 and 51 and most of the force imparted by the press is directed downwardly of each half while some of the force is transmitted towards the ends of each half as shown in FIG. 6. Continued downward movement of the press causes the halves to move from a position shown in phantom lines in FIG. 7 to a position shown in full lines. During this movement, the outer free end of each of the halves is unrestricted and therefore the downwardly directed force merely causes the outer ends to move away from the shank.

However, since the inner end of each half is still attached to the shank 21, the inwardly directed force tries to compact the metal at the inner end of each half. Because the upper and lower surfaces of the inner end of each half is unsupported, it is easier for the metal of the inner ends to flow toward the unsupported surfaces so that the upper surface is urged inwardly to fill the groove 33 while the lower surface is urged downwardly into engagement with the upper surface of the pressure pads 62.

With particular reference to FIG. 8, as the press continues its downward movement, the halves are moved from a position shown in phantom lines to a position shown in full lines. During this movement, the outer ends continue to move outwardly while force imparted to the inner ends continue to cause the metal to flow so that the upper surface flows towards the groove 33 and the lower surface progressively extends outwardly along the upper surface of the pressure pads. This flowing of the metal of the inner ends of each half causes the groove which was created by the slitting tools to close so that the widest expanse of such groove does not extend more than one-third the thickness of the sheet metal. Also, the flowing of the metal causes at least the inner portion of each half to assume a thickness which is greater than one-half the thickness of the sheet material of the stem 21. As shown clearly in FIG. 8, the end of the power stroke of the press 64 terminates at a position above the pressure pads in which the spacing between the press and the pressure pads is greater than one-half the thickness of the sheet material and therefore each of the halves of the head includes an enlarged flat generally planar portion 32 and the outer portion of the free ends are connected to the flat area by an inclined portion 31.

In the manufacturing operation, the elongated strip of sheet material is advanced or indexed between stations which are equally spaced along the manufacturing line. In this manner, the slitting and forming steps are operated simultaneously, but each of the projections 43 is positioned sequentially at each station A though E.

As a specific example, it is contemplated that at least one form of fastener developed in accordance with the present invention is a sheet metal tack or nail for use in driving or fastening objects to metallic structures. Typically, the sheet metal material is a high carbon steel which has been manufactured to a hardness of approximately Rockwell B-50 or has been annealled to such hardness and in this example such material is approximately 0.500 inch (12.70 mm) in height and 0.062 inch (1.588 mm) in thickness. At station A, the projections 43 are blanked having a radius of approximately 0.073 inch (1.854 mm) at one end, a height of 0.250 inch (6.350 mm) and may taper downwardly to a width of approximately 0.200 inch (5.080 mm) at the place where the projection is connected to the base material.

At station B. the shear line may be cut to a depth of approximately 0.068 inch (1.727 mm) below the upper edge of the projection 43 with the shear line being spaced from the upper surface of the pressure pads 44 by approximately 0.030 inch (0.762 mm) to 0.060 inch (1.524 mm). At station C, the secondary shear line may be cut to a depth of approximately 0.140 inch (3.556 mm) below the upper edge of the projection 43 and the final shear at station D may be to a depth of approximately 0.200 inch (5.080 mm) below such upper edge.

After the head has been formed at station E, the strip of material is advanced to one or more punching or cutting stations (not shown) where a shank 21 of any desired configuration is punched or cut from the strip of sheet material with the upper portion 23 of the shank being spaced inwardly from the outer edge of the head 22.

When the fastener has been completed, such fasteners usually are heat treated to a desired hardness, such as Rockwell C50 for example. The increased thickness of the head and the fact that the groove 33 is no more than one-third the thickness of the shank and is located centrally thereof substantially reduces any tendency of the fastener to fracture or crack at the groove 33 or at the line where the head joins the shank.

Although the fastener has been described as being made from a high carbon steel, it is contemplated that such fastener could be made of a steel having a low carbon content and thereafter such metal could be carbonized in a carburizing process so that the fastener may be heat treated to an appropriate hardness.

I claim:

1. A split head fastener constructed of sheet metal having a predetermined thickness comprising an integrally connected head and shank, said shank having an uppermost portion and a tip, said uppermost portion of said shank having a thickness substantially equal to that of the sheet metal, said head having two substantially identical halves which are integrally connected to said uppermost portion of said shank, said halves of said head being separated by a groove which extends generally transversely with respect to said thickness of said uppermost portion of said shank, each of said halves having at least a portion disposed perpendicular to the elongated axis of said shank and being greater in thickness than one-half the thickness of said uppermost portion of said shank.

2. The invention of claim 1 in which said groove extends generally centrally of said thickness of said uppermost portion of said shank.

3. The invention of claim 2 in which said groove overlies no more than one-third of the thickness of said uppermost portion of said shank.

4. The invention of claim 1 in which said halves include outer portions, said outer portions of said halves being tapered from said portions of said head which are disposed perpendicularly to the axis of said shank.

5. A fastener constructed from a strip of sheet metal comprising a head and shank, said shank having an upper portion with a predetermined thickness, said head having two substantially identical halves partially separated by a groove, each of said halves of said head having an impacting portion which overlies and is integrally connected to said shank, said impacting portions of each half being generally coplanar with respect to one another and disposed relatively perpendicular to said shank, each of said halves of said head having a thickness which is greater than one-half the predetermined thickness of said shank, said groove extending substantially from side to side of said head generally centrally of the thickness of said upper portion of said shank, and each of said impacting portions of said halves of said head overlying at least one-third of said thickness dimension of said upper portion of said shank and on opposite sides of said groove.

6. A split head fastener constructed of sheet metal having a predetermined thickness comprising an integrally connected head and shank, said shank having an uppermost portion and a tip, said uppermost portion of said shank having front and rear walls, said head having two halves which are separated by a groove which extends generally parallel with respect to said front and rear walls of said uppermost portion of said shank, each of said halves of said head having an inner portion which overlies at least one-third of said uppermost portions of said shank, said inner portions having a thickness which is generally greater than one-half of the predetermined thickness of the sheet metal.

7. The invention of claim 6 in which said inner portions of said halves of said head extend generally perpendicularly to the elongated axis of said shank.

8. The invention of claim 7 in which each of said halves of said head have outer portions which are tapered in thickness and are of a lesser thickness than said inner portions.

9. The method of manufacturing a fastener from sheet metal having a predetermined thickness to form a fastener having a shank with an integrally connected head in which the head is defined by a thickness greater than one-half of that of the sheet metal comprising the steps of:
  A. Blanking one edge of the sheet metal to form an outwardly extending projection along said edge;
  B. Slitting said projection lengthwise to form two substantially identical halves, the thickness of said halves being substantially equal to one-half the thickness of the sheet metal;
  C. Shaping each of said halves into a generally arcuate configuration with the innermost portions integrally connected to said sheet metal and with a gap therebetween;
  D. Holding said sheet metal adjacent to said innermost portion with the holding means positioned adjacent to the free end of said arcuate portions; and
  E. Pressing said halves simultaneously to apply a force toward said holding means and transmitting at least part of said force toward opposite ends of said halves so that the semicircular portions are flattened and the force which is transmitted inwardly causes the metal to flow toward said holding means as well as flow toward the other half and partially fill said gap.

* * * * *